(12) United States Patent
Hähn et al.

(10) Patent No.: US 8,099,847 B2
(45) Date of Patent: Jan. 24, 2012

(54) TOOL

(75) Inventors: Günter Hähn, Königswinter (DE);
Martin Lenz, Großmaischeid (DE);
Thomas Lehnert, Oberraden (DE);
Stefan Abresch, Dierdorf (DE)

(73) Assignee: Wirtgen GmbH (DE)

( * ) Notice: Subject to any disclaimer, the term of this patent is extended or adjusted under 35 U.S.C. 154(b) by 739 days.

(21) Appl. No.: 12/215,919

(22) Filed: Jun. 30, 2008

(65) Prior Publication Data
US 2009/0019679 A1  Jan. 22, 2009

(30) Foreign Application Priority Data
Jul. 2, 2007 (DE) .......... 10 2007 030 640

(51) Int. Cl.
*B25B 27/02* (2006.01)

(52) U.S. Cl. .............. 29/252; 29/270; 29/239

(58) Field of Classification Search ............ 29/252, 29/244, 255, 270, 278, 280
See application file for complete search history.

(56) References Cited

U.S. PATENT DOCUMENTS

| | | | | |
|---|---|---|---|---|
| 5,761,785 A * | 6/1998 | Connolly | ............ | 29/249 |
| 6,122,810 A * | 9/2000 | McInnes | ............ | 29/264 |
| 6,131,261 A * | 10/2000 | Michlin | ............ | 29/251 |
| 6,415,487 B1 * | 7/2002 | Leimer | ............ | 29/213.1 |
| 6,526,641 B1 * | 3/2003 | Latham | ............ | 29/239 |
| 6,601,277 B1 * | 8/2003 | Swanson | ............ | 29/256 |
| 2009/0019679 A1 * | 1/2009 | Hahn et al. | ............ | 29/252 |

FOREIGN PATENT DOCUMENTS

| | | |
|---|---|---|
| DE | 30 26 930 A1 | 7/1980 |
| DE | 32 23 761 C2 | 6/1982 |
| DE | 84 03 441 U1 | 2/1984 |
| DE | 43 23 669 C1 | 7/1993 |
| WO | WO 97/23710 | 7/1997 |

* cited by examiner

*Primary Examiner* — Lee D Wilson
(74) *Attorney, Agent, or Firm* — Waddey & Patterson, P.C.; Lucian Wayne Beavers

(57) ABSTRACT

A tool for mounting a chisel on a chisel holder, having an actuating member, which has a push-off section, wherein the actuating member can be displaced along a displacement direction. It is possible to simplify changing the chisel if the actuating member can be shifted by an actuating unit. The actuating unit has a draw-in section, which is spaced apart from the push-off section and is arranged transversely with respect to the displacement direction of the actuating member. The actuating member can be power-operated bidirectionally in the displacement direction by the actuating unit.

33 Claims, 4 Drawing Sheets

TOOL

BACKGROUND OF THE INVENTION

1. Field of the Invention

This invention relates to a tool for removal of a chisel from a chisel holder, having an actuating member, which has a push-off section, wherein the actuating member can be displaced along a displacement direction.

2. Discussion of Related Art

A tool is known from PCT Reference WO 97/23710 wherein a pin-shaped push-off section is connected to a handle by a hinged connector. The tool is employed for the removal of a chisel inserted into a receiving bore of a chisel holder. The receiving bore is embodied as a through-bore, so that a chisel shank of the inserted chisel is accessible from the rear. A security element is drawn up on the end of the chisel shank, which is held in a groove of the receiving bore and thus maintains the chisel in the chisel holder. If the chisel is to be replaced, for example after reaching a wear limit, the push-off section is pushed through the rear opening into the receiving bore and is brought into contact with the free end of the chisel shank.

Then the handle can be pivoted until it rests against a support section. It is then possible to adjust the handle in the hinged connector with respect to the push-off section. The leverage thus created is introduced into the chisel via the push-off section so that the hold provided by the security element is released. Once the chisel is removed and the tool taken out, a fresh, unworn chisel can be placed against the receiving bore and driven in by a hammer. Changing a chisel by the known arrangement requires great force and, in case of tight space conditions, cannot be performed without danger.

Further removal arrangements are known from German Patent Reference DE 30 26 930 A1. These require a plunger, which is mounted in the area for the receiving bore of the chisel. The plunger can be linearly displaced against the shank end of the chisel, so that the chisel can be moved out of the receiving bore. Hydraulic systems or mechanical lever systems are employed for driving the plunger. These known tools require a lot of structural space, which cannot always be provided. Also, fine particles of the removed material enter the receiving bore designed as a blind bore during the operational use and cannot leave it again. They then impair the function of the removal arrangement and the free rotatability of the chisel in the insert.

Tools are known, which propose the insertion into or removal of a chisel from a chisel head. For example, German Patent Reference DE 43 23 669 C1, German Patent Reference DE 84 03 441 U1, U.S. Pat. No. 6,526,641 B1 and German Patent Reference DE 32 23 761 C2 show claw retractors that engage a circumferential groove in the chisel head with adjustable claws. For removal, the claws can then be adjusted in the longitudinal direction of the chisel. These known tools always require a shaped surface on the chisel head, behind which they can extend when pulling out the chisel. If this shaped surface is worn out because of heavy wear on the chisel, or if the chisel head is broken off, the tools are useless.

SUMMARY OF THE INVENTION

It is one object of this invention to provide a tool of the type mentioned above but which considerably simplifies the replacement of the chisel.

This object is attained if the actuating member can be shifted by an actuating unit, the actuating unit has a draw-in section spaced apart from the push-off section and arranged transversely with respect to the displacement direction of the actuating unit, and the actuating member can be power-operated bidirectionally in the displacement direction by the actuating unit.

While the push-off section is used for chisel removal, the chisel can be brought into the mounting position by the draw-in section. This becomes possible by the actuating unit, which shifts the actuating member bidirectionally, and therefore into the mounting and the removal direction. The actuating member can be power-operated by the actuating unit, for example by an electric or a hydraulic drive mechanism, so that the work of replacing the chisel is considerably more easy for the user. Thus, the tool in accordance with this invention can perform mounting, as well as removal work.

In accordance with this invention, the actuating member can have a receiving section between the push-off section and the draw-in section, which is accessible transversely to the displacement direction of the actuating member. With a matched body contour, the chisel can be easily inserted into the receiving section. The body contour can have a circumferential groove at the shank of the chisel, for example, which the actuating member engages.

If the extension of the receiving section transversely to the feed direction is less than or equal to the maximal cross section of the actuating member in this direction, then the receiving section does not extend past the actuating member transversely to the feed direction. It is thus possible to achieve a compact construction. This has advantages, for example, if the chisel is to be mounted or removed through a receiving bore, in which the chisel is maintained.

For providing large mounting forces, and in particular also large removal forces, in one embodiment of this invention, the actuating unit has a hydraulic unit with a hydraulic cylinder, on which a piston can be displaced, and the actuating member is connected with the piston via a piston rod. In this case, the hydraulic unit can have a reversing unit, which makes possible a force to act bidirectionally on the piston.

For a tool which is easy to manipulate, in one embodiment of this invention, the hydraulic unit is connected to an electric motor, the electric motor is connected to a battery, and the hydraulic unit, the electric motor and the battery can be combined in a manually operable structural unit. In that case, the tool can be operated independently of an external energy supply and can be easily handled.

Mounting and removal can be dependably performed, if there is a positive connection between the chisel and the actuating member. Thus, with this invention, the actuating unit has two support faces oriented in opposite directions, which are directed in the displacement direction of the actuating member.

For achieving a fixed and positionally-stable association of the mounting tools during mounting, as well as removal, the actuating unit has two support elements, which are arranged spaced apart from each other in the displacement direction. With these support elements the tool can then be supported on counter-faces of the chisel holder, and the like, which are especially thus provided.

It should be possible to place the actuating member into a defined initial position for easy operation. In one embodiment of this invention, the actuating unit has an alignment section on which the actuating member is aligned in its retracted or extended end position.

BRIEF DESCRIPTION OF THE DRAWINGS

This invention is explained in greater detail in view of an exemplary embodiment represented in the drawings, wherein.

DETAILED DESCRIPTION OF THE INVENTION

Figure 1:
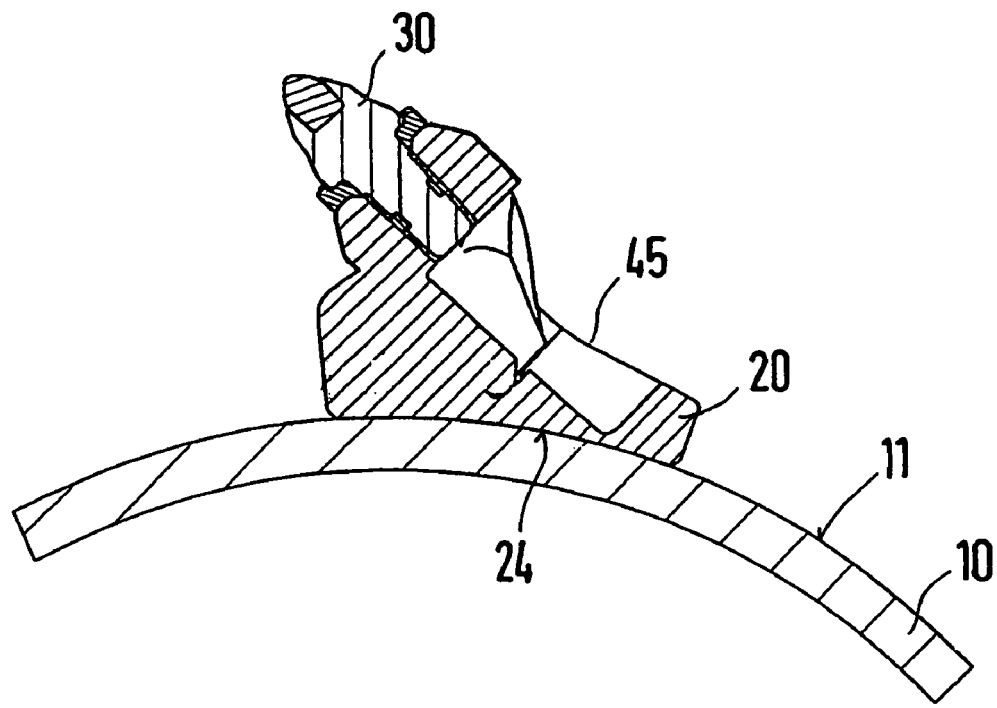
FIG. 1 shows a tool unit arranged on a cutting roller tube in a lateral view and in section.
Figure 2:
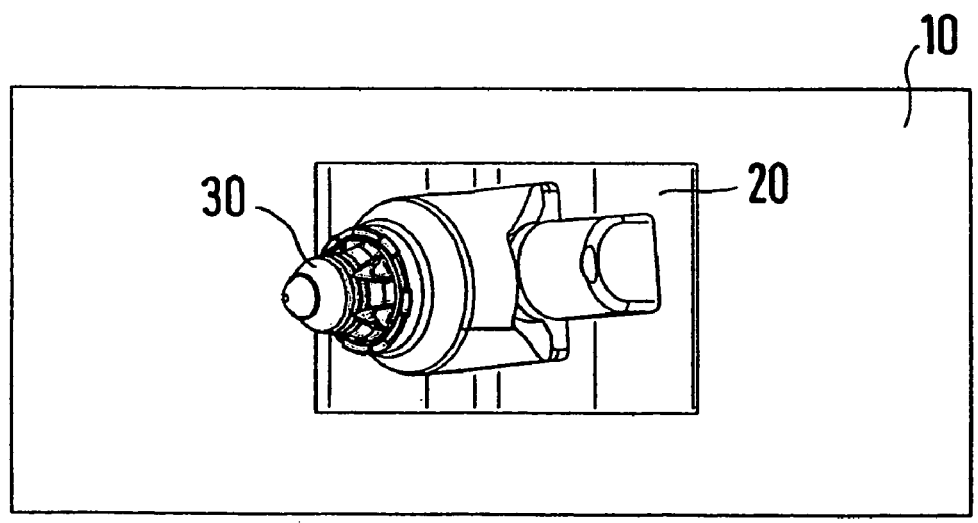
FIG. 2 shows a representation in accordance with FIG. 1, in a top view.

As FIG. 1 shows, a tool unit is attached, in particular welded, to the roller surface 11 of a cutting roller tube 10 of a rock-cutting machine, for example a surface mining machine, a road-cutting machine, or the like.

Customarily, a plurality of the tool unit represented is used and is arranged at even spacing from each other.

Figure 3:
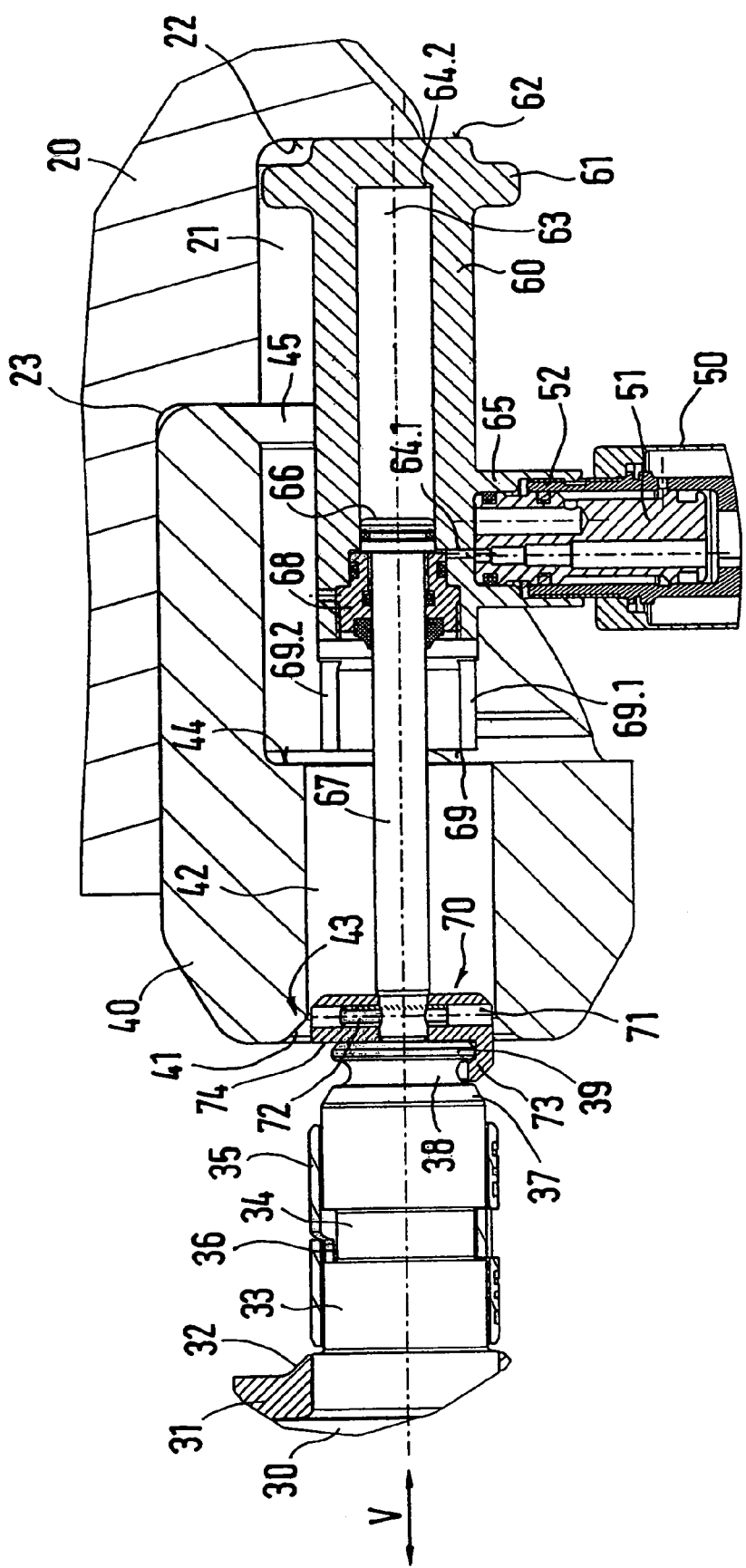
FIG. 3 shows the tool unit in accordance with FIGS. 1 and 2 with a tool, and at the end of the removal movement, the removal position, in an enlarged detailed view and in section.

The tool unit comprises a base element 20 which, with a concave contact section, is placed on the roller surface 11 and welded on it. The base element 20 has a tool receptacle 21, into which a chisel 30, in particular a round shank chisel, is inserted. In the customary way, the chisel 30 has a chisel head and an adjoining chisel shank 33. As shown in FIG. 3, the chisel 30 has a clamping sleeve 35 in the area of or near its chisel shank 33. The clamping sleeve 35 enters and engages a circumferential groove 34 of the chisel shank 33 with holding elements 36. It is thus freely rotatable, but is held fixed against being released in the axial direction.

Figure 4:
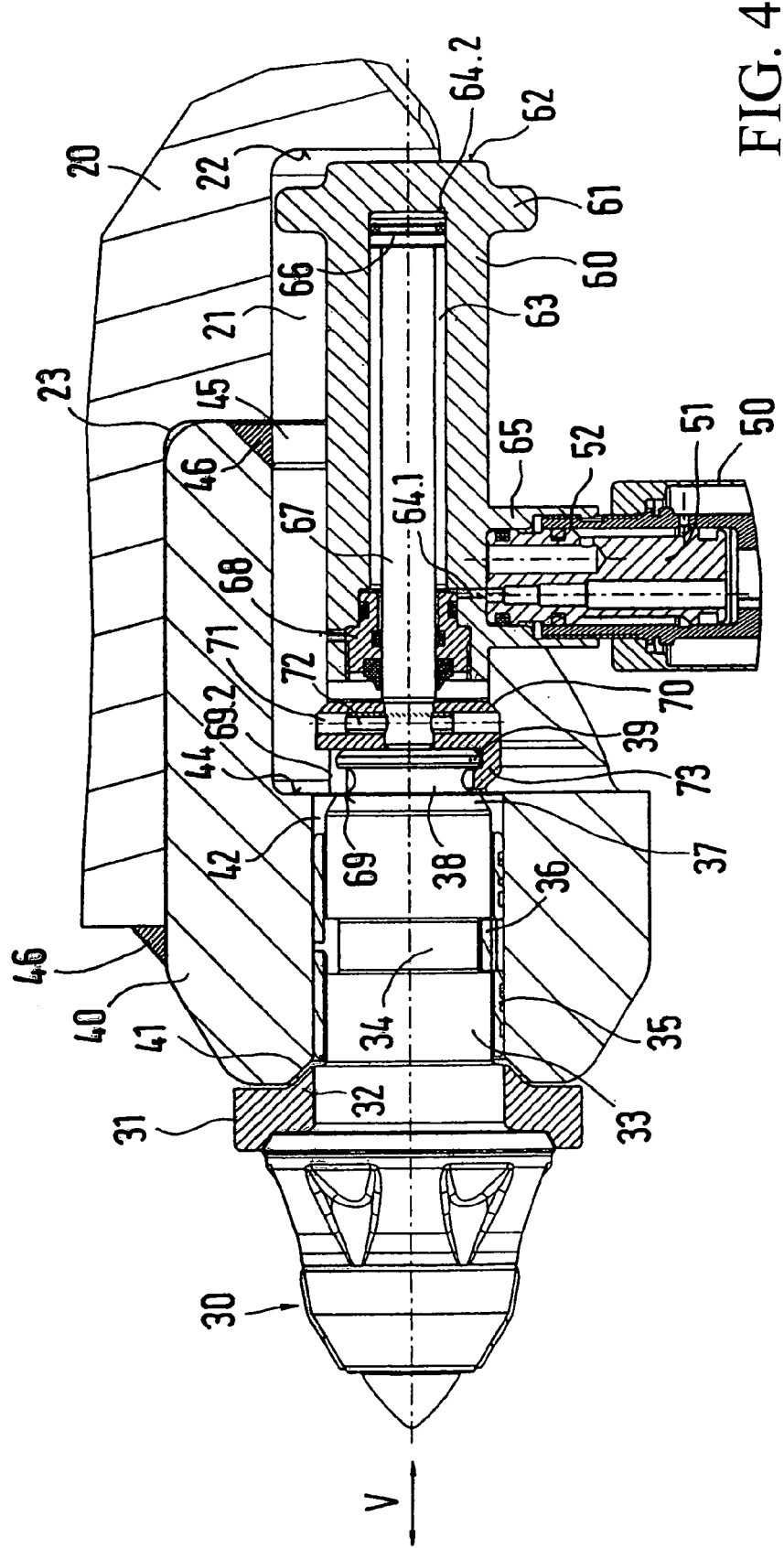
FIG. 4 shows the representation in accordance with FIG. 3 at the end of the mounting movement, the mounting position.
Figure 5:
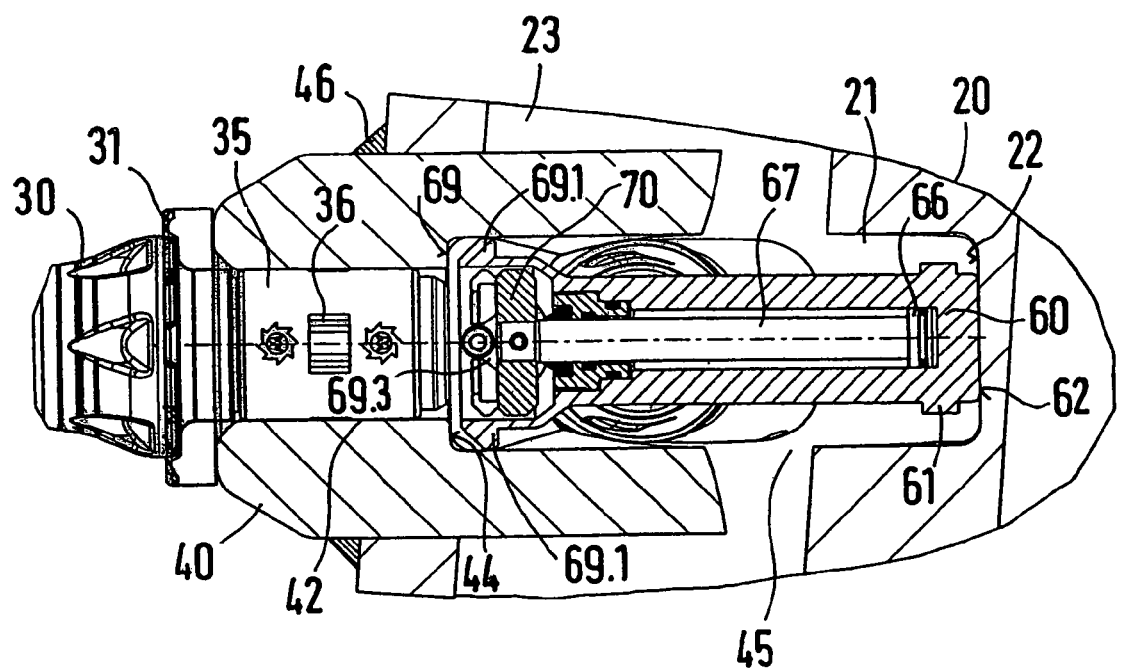
FIG. 5 shows the arrangement in accordance with FIG. 4, in a top view.

In the tool embodiment in accordance with FIGS. 3 to 5, in the mounted state the chisel head is supported on a support face of a chisel holder 40, with the interposition of a wear-protection disk 31. On its end facing away from the chisel head, the chisel shank 33 has an end piece, which is not covered over by the clamping sleeve 35. This end piece forms a collar 37, with a diameter less than the diameter of the remaining shank area. The collar 37 has a circumferential groove 38. A cylindrical support element 39 adjoins the groove 38.

The chisel holder 40 has a chamfering extending around the chisel receiver 42, which is used as a centering receptacle 41 and delimits the insertion opening 42 for the chisel 30. The chisel holder 40 can be inserted into a chisel holder receptacle 23 of the base element 20 and can be fixedly connected with the base element 20, for example welded to it such as shown by weld seams 46 in FIG. 4. In case of wear, it is possible to cut the weld seams 46 open and to exchange the chisel holder 40 for a fresh, not worn, one. In one embodiment of the tool, the base element 20 and the chisel holder 40 are combined into a one-piece structural unit, such as shown in FIG. 1.

As FIGS. 3 and 4 and FIG. 1 further show, the base element 20 and the chisel holder 40 form a pocket-shaped, laterally open bulge 45, open toward the top in accordance with FIG. 1.

A tool can be introduced into the bulge 45 and can be used for mounting, as well as the removal of the chisel 30.

The tool has an actuating unit 60 surrounding a cylinder-shaped interior chamber 63. A piston 66 is linearly conducted between two end positions in the interior chamber 63. The piston 55 is sealed against the cylinder wall delimiting the interior chamber by an O-ring. A piston rod 67 is connected to the piston 66 and is conducted out of the interior chamber 63 through a closure insert 68. The closure insert 68 is sealingly inserted into the open side of the actuating unit 60. The piston rod 67 is also sealed against the closure insert 68, so that a pressure-proof interior chamber 63 results. On its free end, facing away from the piston 66, the piston rod 67 has an actuating member 70. The actuating member 70 is fastened to it by a dowel pin 72 pushed through the bore 71 of the actuating member 70. The actuating member 70 has a draw-in section 73 and a push-off section 74 spaced apart from each other, so that a claw results. The spacing is selected so that the chisel 30 can be inserted into the claw so that the off draw-in section 73 engages the groove 38.

On its rear end, the actuating unit 60 has a support element 61 formed by a widened contour.

A flat support face 62 at the end closes off the actuating unit 60 in the rear, while a support face 69 is arranged on the opposite front side. The support face 69 is formed by a front support element 69.1, which has a lateral cutout 69.2.

A handle 50 with a battery-operated hydraulic unit 51 is connected to a handle holder 65 of the actuating unit 60. Because the electrical current supply is integrated into the handle 50, an easily manipulated tool results.

The hydraulic unit 51 is connected via hydraulic lines 64.1 and 64.2 with the interior chamber 63. The interior chamber 63 and the hydraulic unit 51 are filled with a fluid, in particular a hydraulic fluid.

Referring to FIG. 4, the process for removing the chisel 30 from the chisel receiver 42 of the chisel holder 40 will be described. The tool is inserted into the bulge 45. In the process, the tool is centered with the support elements 61 and 69.1 on counter-faces of the base element 20 and of the chisel holder 40, so that it can be aligned. The support element 61 and the actuating member 70 aid the inserting movement, wherein the support element 61 acts against the cylindrical support element 39 of the chisel 30. The support elements 61 and 69.1 guide the tool perpendicularly with respect to the inserting movement, such as shown in FIG. 5.

When inserting the tool into the bulge 45, a cutout 69.2 in the support element 69.1 makes access to the chisel 30 possible, and the draw-in section 73 engages the groove 38 of the chisel 30. In this mounting position, it is possible to activate the hydraulic unit 51. During this, hydraulic fluid is conveyed through the hydraulic line 64.2, and the piston 66 is axially displaced in the direction toward the chisel 30. The flat push-off section 74 is simultaneously placed against the free end of the chisel 30. The chisel 30 is pushed out of the receiving bore 42 against the frictional force exerted by the clamping sleeve 35. During this process, the actuating unit 80 is supported by its support face 62 on the corresponding counter-face of the base element 20, as shown in FIG. 3. The front-side support face 69 is then released, which is shown by the spacing area having a dimension of 3 mm. The push-out movement of the piston 66 is limited at the closure insert 68.

The actuating member 70 is extended out of the chisel receiver 42 sufficiently far, so that the chisel is released and can be removed.

The process for mounting a chisel 30 will be described.

Proceeding from the position of the tool shown in FIG. 3, it is possible to insert the support section 39 of a chisel 30 into the groove area of the actuating member 70 formed between the draw-in section 73 and the push-off section 74. The positioning indicated in FIG. 3 results. The hydraulic unit 51 can be reversed by a switching arrangement 52, so that the hydraulic fluid is conveyed via the hydraulic line 64.1 into the interior chamber 63 and is pumped out of it through the hydraulic line 64.2. Thus, the piston 66 is displaced from left to right in the drawing plane of FIG. 3, until it reaches the end position shown in FIG. 4. During this, the chisel 30 is drawn into the chisel receiver 42 by the draw-in section 73 engaging the support element 39. To make mounting easier, the free end of the chisel 30, as well as the clamping sleeve 45, are threaded into the centering receptacle 41. In the process, the circumference of the longitudinally-slit clamping sleeve 35 is compressed and is drawn under friction along the interior wall defining the chisel receiver 42 until it reaches the end position shown in FIG. 4. During the draw-in, the support element 69.1 of the actuating unit 60 is supported on the contact face 44 of the chisel holder 40, while the support section 22 is released. In the mounted state, the wear-protection disk 31 of the chisel 30 engages the centering receptacle 41 with a centering insert 32.

Once the chisel 30 is drawn in, the tool can be lifted out of the tool receptacle 21. To prevent the actuating member 70 from becoming twisted in relation to the actuating unit 60, in the position shown in FIG. 5, the actuating member 70 is aligned secure against turning in the circumferential direction against a stop, the alignment section 69.3, of the actuating unit 60.

German Patent Reference 10 2007 030 640.9, the priority document corresponding to this invention, and its teachings are incorporated, by reference, into this specification.

What is claimed is:

1. A tool for mounting and demounting a chisel on a chisel holder, comprising:
    an actuating unit having two support faces oriented in opposite directions for supporting the actuating unit within a cavity of the chisel holder, the actuating unit including a bidirectionally displaceable actuator rod extendable from the actuating unit in a displacement direction transverse to the support faces; and
    an actuating member connected to the actuator rod for movement with the actuator rod in the displacement direction, the actuating member including:
        a push-off section including a push-off surface facing away from the actuating unit for demounting the chisel from the chisel holder upon extension of the actuator rod; and
        a draw-in section spaced apart from the push-off section in the displacement direction and extending transversely to the displacement direction for mounting the chisel on the chisel holder upon retraction of the operator rod.

2. The tool in accordance with claim 1, wherein the actuating member has a receiving section between the push-off section and the draw-in section accessible transversely to the displacement direction of the actuating member.

3. The tool in accordance with claim 2, wherein an extension of the receiving section transversely to the displacement direction is less than or equal to a maximal cross section of the actuating member in transversely to the displacement direction.

4. The tool in accordance with claim 3, wherein the actuating member with the push-off section and the draw-in section is in a claw shape, and an insertion groove in a shape of an arc is delimited by the push-off section and the draw-in section.

5. The tool in accordance with claim 4, wherein the actuating unit has a hydraulic unit with a hydraulic cylinder in which a piston is displaceable, and the actuating member is connected with the piston by the actuator rod.

6. The tool in accordance with claim 5, wherein the hydraulic unit is connected to an electric motor, the electric motor is connected to a battery, and the hydraulic unit, the electric motor and the battery are combined in a manually operable structural unit.

7. The tool in accordance with claim 6, wherein the actuating unit has two support elements spaced apart from each other in the displacement direction.

8. The tool in accordance with claim 7, wherein the actuating unit has an alignment section on which the actuating member is aligned in a retracted position or an extended end position.

9. The tool in accordance with claim 1, wherein the actuating member with the push-off section and the draw-in section is in a claw shape, and an insertion groove in a shape of an arc is delimited by the push-off section and the draw-in section.

10. The tool in accordance with claim 1, wherein the actuating unit has a hydraulic unit with a hydraulic cylinder on which a piston is displaceable, and the actuating member is connected with the piston by a piston the actuator rod.

11. The tool in accordance with claim 10, wherein the hydraulic unit is connected to an electric motor, the electric motor is connected to a battery, and the hydraulic unit, the electric motor and the battery are combined in a manually operable structural unit.

12. The tool in accordance with claim 1, wherein the actuating unit has two support elements spaced apart from each other in the displacement direction.

13. The tool in accordance with claim 1, wherein the actuating unit has an alignment section on which the actuating member is aligned in a retracted position or an extended end position.

14. The tool in accordance with claim 1, wherein:
    a first one of the two support faces is configured to support the tool within the cavity of the chisel holder against forces applied by the push-off section against the chisel to demount the chisel during extension of the actuator rod.

15. The tool in accordance with claim 14, wherein:
    the other one of the two support faces is configured to support the tool within the cavity of the chisel holder against forces applied by the draw-in section against the chisel to mount the chisel during retraction of the actuator rod.

16. The tool in accordance with claim 1, further comprising:
    a handle extending from the actuating unit so that a human operator may grip the handle and move the actuating unit into and out of the cavity of the chisel holder.

17. The tool in accordance with claim 1, wherein:
    the draw-in section is fixed relative to the push-off section.

18. The tool in accordance with claim 17, wherein:
    the draw-in section and push-off section are integral sections of the actuating member.

19. The tool in accordance with claim 1, wherein:
    the two support faces of the actuating unit define therebetween a minimum length of the actuating unit in the displacement direction; and
    the actuating member is movable by the actuating unit between a retracted position wherein the actuating member is located between the two support faces of the actuating unit, and an extended position wherein the actuating member is located outside of the actuating unit beyond one of the two support faces.

20. The tool in accordance with claim 19, wherein:
    the actuating unit includes a bifurcated end on which said one of the two support faces is defined, the bifurcated end defining a cavity within which the actuating member is received in its retracted position.

21. A tool for installing and removing a chisel on a chisel holder, comprising:
an actuating unit;
an actuating member displaceable relative to the actuating unit in a displacement direction;
the actuating unit having first and second support faces defined thereon and facing in opposite directions, the support faces defining an external length of the actuating unit therebetween parallel to the displacement direction;
the actuating member being displaceable between a retracted position wherein the actuating member is located between the two support faces, and an extended position wherein the actuating member is extended beyond the first support face; and
wherein the actuating member includes a push-off section including a push-off surface facing away from the actuating unit when the actuating member is in its extended position, and a draw-in section spaced apart from the push-off section on an opposite side of the push-off section from the actuating unit when the actuating member is in its extended position.

22. The tool of claim 21, wherein:
the push-off section and the draw-in section of the actuating member are fixed relative to each other and define a receiving section between the push-off section and the draw-in section, the receiving section extending transversely to the displacement direction.

23. The tool of claim 22, wherein:
the draw-in section extends transversely to the displacement direction less than does the push-off section.

24. The tool of claim 22, wherein:
the receiving section comprises an arc shaped groove.

25. The tool of claim 21, wherein:
the first support face of the actuating unit is divided into two portions by a cut-out, and when the actuating member is in its retracted position, the actuating member is received in the cut-out.

26. The tool of claim 21, further comprising:
a handle extending from the actuating unit so that a human operator may grip the handle to move the tool into and out of engagement with the chisel holder.

27. The tool of claim 21, wherein:
the first support face is configured to support the tool against the chisel holder when the actuating member is being retracted; and
the second support face is configured to support the tool against the chisel holder when the actuating member is being extended.

28. The tool of claim 21, wherein:
the actuating unit further includes a transversely extending support element extending outward from the actuating unit transverse to the displacement direction to transversely support the actuating unit.

29. A tool for mounting and demounting a chisel on a chisel holder, comprising:
an actuating unit including a bidirectionally displaceable actuator rod extendable from the actuating unit in a displacement direction;
a handle extending from the actuating unit so that a human operator may grip the handle and move the actuating unit into and out of the cavity of the chisel holder; and
an actuating member connected to the actuator rod for movement with the actuator rod in the displacement direction, the actuating member including:
a push-off section including a push-off surface facing away from the actuating unit for demounting the chisel from the chisel holder upon extension of the actuator rod; and
a draw-in section spaced apart from the push-off section in the displacement direction and extending transversely to the displacement for mounting the chisel on the chisel holder upon retraction of the operator rod.

30. A tool for mounting a chisel on a chisel holder, comprising:
an actuating unit;
an actuating member shiftable by the actuating unit and having a push-off section, wherein the actuating member can be displaced by the actuating unit along a displacement direction;
the actuating member having a draw-in section spaced apart from the push-off section and arranged transversely with respect to the displacement direction of the actuating member;
the actuating member being power-operated bidirectionally in the displacement direction by the actuating unit; and
wherein the actuating unit has a hydraulic unit with a hydraulic cylinder on which a piston is displaceable, and the actuating member is connected with the piston by a piston rod, and the hydraulic unit is connected to an electric motor, the electric motor is connected to a battery, and the hydraulic unit, the electric motor and the battery are combined in a manually operable structural unit.

31. A tool for mounting and demounting a chisel on a chisel holder, comprising:
an actuating unit having two support faces oriented in opposite directions for supporting the actuating unit within a cavity of the chisel holder, the actuating unit including a bidirectionally displaceable actuator rod extendable from the actuating unit in a displacement direction transverse to the support faces;
a handle extending from the actuating unit so that a human operator may grip the handle and move the actuating unit into and out of the cavity of the chisel holder; and
an actuating member connected to the actuator rod for movement with the actuator rod in the displacement direction, the actuating member including:
a push-off section including a push-off surface facing away from the actuating unit; and
a draw-in section spaced apart from the push-off section in the displacement direction and extending transversely to the displacement direction to define a receiving section between the push-off section and the draw-in section, the receiving section being accessible transversely to the displacement direction.

32. The tool of claim 31, wherein:
a first one of the two support faces is configured to support the tool within the cavity of the chisel holder against forces applied by the push-off section against the chisel to demount the chisel during extension of the actuator rod.

33. The tool of claim 32, wherein:
the other one of the two support faces is configured to support the tool within the cavity of the chisel holder against forces applied by the draw-in section against the chisel to mount the chisel during retraction of the actuator rod.

* * * * *

UNITED STATES PATENT AND TRADEMARK OFFICE
CERTIFICATE OF CORRECTION

| | | |
|---|---|---|
| PATENT NO. | : 8,099,847 B2 | Page 1 of 1 |
| APPLICATION NO. | : 12/215919 | |
| DATED | : January 24, 2012 | |
| INVENTOR(S) | : Hähn et al. | |

It is certified that error appears in the above-identified patent and that said Letters Patent is hereby corrected as shown below:

Column 4, line 8, delete "off" before --draw-in--.
Column 5, line 44, replace "operator" with --actuator--.
Column 5, line 52, delete "in" before --transversely--.
Column 6, line 16, delete "a piston" before --the actuator rod--.
Column 8, line 8, replace "operator" with --actuator--.

Signed and Sealed this
Twentieth Day of March, 2012

David J. Kappos
*Director of the United States Patent and Trademark Office*